3,272,432
CONTROL SYSTEM FOR WATER HEATERS
Thomas J. Davidson, Santa Ana, Calif., assignor to Honeywell Inc., Minneapolis, Minn., a corporation of Delaware
Filed Mar. 8, 1965, Ser. No. 437,644
3 Claims. (Cl. 236—21)

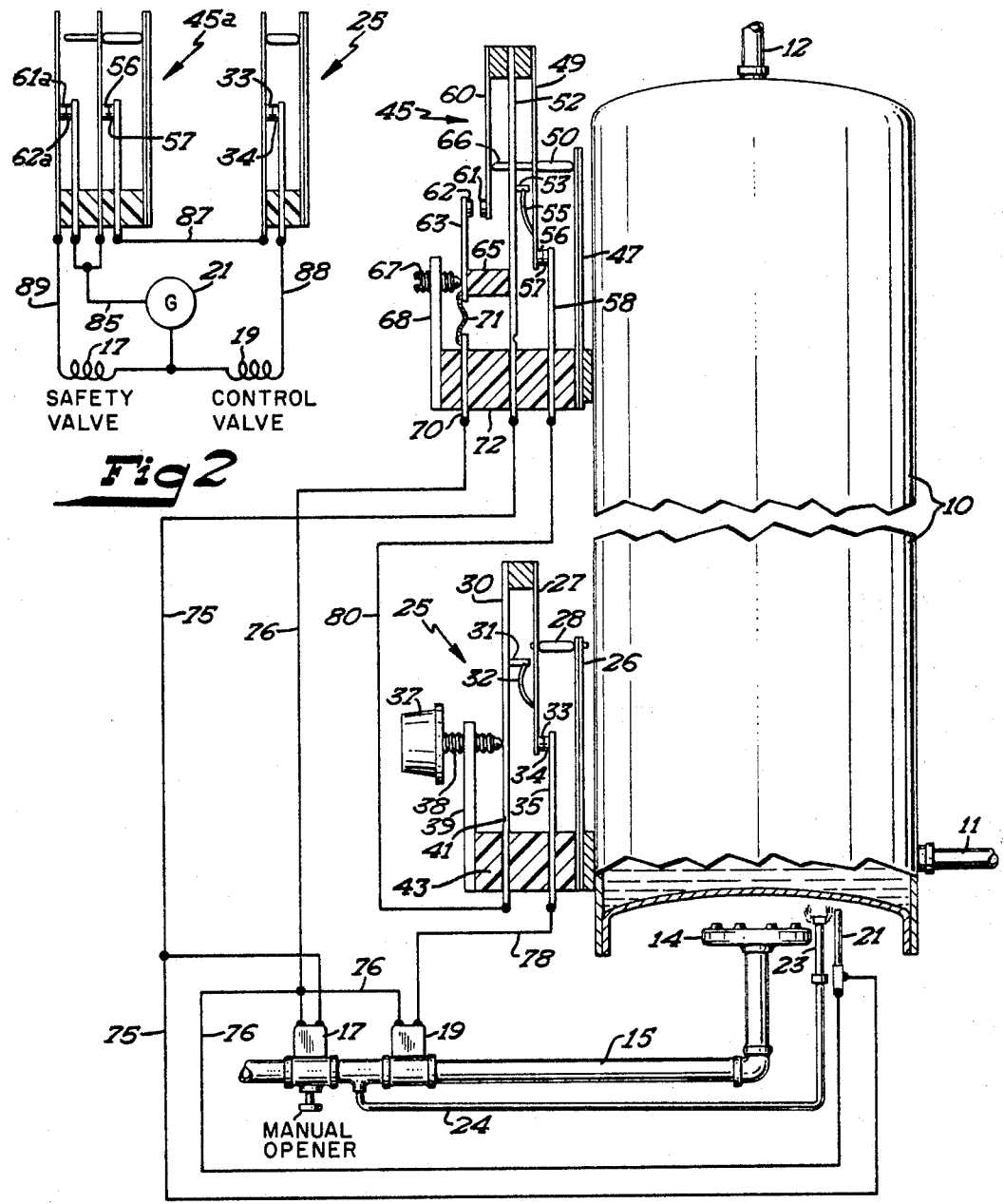

The present invention is directed to control of gas fired water heaters and particularly to an arrangement that will assure safe operation while permitting water temperature to be maintained at a relatively high value.

The system employs a thermoelectric generator energized by the pilot flame as the energy source for a control circuit for the main gas valve as well as for a safety valve of the type requiring manual opening. The principal control for the main valve is a thermostat located to sense water temperature near the bottom of the tank to assure heating of the entire tank to the desired temperature. This thermostat may be adjusted, for example, at some point between 120° F. and 160° F. A safety thermostat is located near the top of the tank and connected to the safety valve to cause the valve to close when water temperature approaches an unsafe condition. The setting of this thermostat may be 200° F. to prevent boiling water being supplied to points of use of the hot water supply. Operation of this thermostat causes a safety shutdown.

In the present system an additional thermostat senses water temperature near the top of the tank and is connected in the circuit of the main gas valve to close the main valve at a temperature somewhat below the setting of the safety thermostat, by way of example at 180° F. Operation of this limit thermostat does not cause a safety shutdown, but rather closes the main valve until temperature at the top of the tank falls below its setting, at which time gas will again be supplied to the main burner if the controlling thermostat lower on the tank remains unsatisfied.

Under some conditions of use of hot water it is possible for the temperature at the top of the tank to become excessive while the main control thermostat is calling for additional heat. This condition is, of course, more apt to occur when the main control thermostat is set toward the top of its range. Tanks having a flue passing vertically through the tank are susceptible to this condition. In this system safety shutdown is prevented unless there is a malfunction of the main gas valve, or pilot flame failure, and maximum supply of hot water is possible without the danger of nuisance shutdowns. When operating conditions are such as to cause operation of the limit thermostat, it may be considered that the main valve is being controlled by both the main thermostat and the limit thermostat to provide the desired supply of hot water.

In the drawing, FIGURE 1 shows a safety control system for a water heater, and FIGURE 2 shows diagrammatically a modified circuit providing the same control function.

A tank 10 having a cold water inlet 11 and a hot water outlet 12 is heated by a main gas burner 14. Gas is supplied to the burner 14 through a supply line 15 having located therein in series a safety valve 17 and a main control valve 19. The safety valve 17 is of the type that will remain open when electrically energized but which must be manually opened. The main control valve opens when electrically energized and closes when de-energized. The energizing current for both valves is supplied by a thermoelectric generator 21 which is energized by the flame of a pilot burner 23 connected to the supply line 15 ahead of control valve 19 by a pipe 24. The valves 17 and 19 may be separate units as shown or may be combined in a single housing as described in Matthews Patent No. 2,717,381.

A thermostatic switch 25 has a bimetal element 26 secured in good heat transfer relation to a surface of the tank 10 relatively close to its bottom so as to respond to water temperature in the lower part of the tank. Bimetal element 26 operates a snap switch blade 27 by a connecting insulating strut 28. The blade 27 is carried by a strip 30 having a tab 31 which engages the compression leg 32 formed in blade 27 to provide snap action. The free end of blade 27 carries a contact 33 that cooperates with a stationary contact 34 on a conducting strip 35. An adjusting knob 37 turns a screw 38 threaded in a member 39 to position the switch mechanism with respect to the bimetal and adjust the control point of the thermostat. The strip 30 is resilient and shaped to follow adjustments of the screw 38, flexing occurring mainly in an area 41 of reduced section. The switch operates with a snap action in the manner described in McGall Patent No. 1,960,020. An insulating member 43 supports the strip 30 as well as strip 35 and member 39 in cooperating relation to the bimetal.

A second thermostatic switch 45 has a bimetal element 47 secured in good heat transfer relation to the surface of the tank 10 relatively closer to its top so as to respond to water temperature in a higher portion of the tank. In the drawing both thermostats are diagrammatically shown greatly enlarged with respect to the tank size. Actually, the thermostat 45 may be located in an area about 8″ from the top of the tank. The bimetal element 47 operates a snap switch blade 49 by a connecting insulating strut 50. The blade 49 is carried at its upper end by a conducting strip 52 which has a tab 53 that engages the compression leg 55 formed in the blade 49. The free end of the blade 49 carries a contact 56 which cooperates with a stationary contact 57 on the end of a strip 58. The strip 52 carries an additional switch blade 60 having a contact 61 at its free end adapted to cooperate with a contact 62 on a blade 63. The blade 63 is carried by the strip 52 on an insulating block 65. The strut 50 which connects the bimetal 47 and the blade 49 has an extension 66 passing through openings in the blade 49 and the strip 52 to engage the blade 60. An adjusting screw 67 is threaded in a member 68 and engages the fixed end of blade 63 to position that blade as well as the strip 52 with respect to the bimetal 47 to adjust the control point of the thermostat. The blade 63 is connected to a conducting strip 70 by a pigtail 71. An insulating member 72 supports the strip 52 as well as the strip 58, member 68 and strip 70 in cooperating relation to the bimetal. The operation of the switch on temperature rise is such as to first open the contacts 56 and 57 and on further temperature rise to close the contacts 61 and 62.

The thermoelectric generator 21 is connected by conductors 75 and 76 to the safety valve 17. Conductor 75 also is connected to the strip 52 of the thermostat 45. The conductor 76 is also connected to the strip 70 of the thermostat 45 and to one terminal of the control valve 19. The other terminal of the valve 19 is connected to strip 35 of the thermostat 25 by a conductor 78 and a conductor 80 connects strip 30 of the thermostat 25 to the strip 58 of the thermostat 45.

The thermostat 25 may be adjusted manually to open the contacts 33 and 34 at any temperature selected, for example, between 120° F. and 160° F. In normal operation this thermostat will cycle the control valve 19 to maintain water temperature near the bottom of the tank at the value selected. Under some normal operating conditions the temperature at the top of the tank may considerably exceed that at the bottom of the tank. In order to assure safe operating conditions the thermostat 45 may be calibrated to open the contacts 56 and 57 at a somewhat higher temperature, for example 180° F. Particularly when the lower thermostat 25 is adjusted at the top of its range the control valve 19 may be cycled by the thermostat 45 rather than by the thermostat 25. In this way a maximum supply of hot water may be stored without the danger of excessive water outlet temperature.

In the event that the control valve 19 should become stuck in its open position and neither the opening of the contacts 33, 34 of thermostat 25 or opening of the contacts 56, 57 of thermostat 45 can turn off the supply of gas, the temperature at the top of the tank will continue to rise and contacts 61, 62 of thermostat 45 will close. This connects conductors 75 and 76 which are connected in parallel to the safety valve 17, greatly reducing the supply of current to the safety valve and causes it to close. Thus, the supply of gas to the water heater is stopped and will not be automatically restarted and the consequent loss of hot water available will alert the home owner to the trouble and result in attention to the system to correct the difficulty.

A modified form of the control system is shown in FIGURE 2 which shows diagrammatically only the electrical circuit involved. The thermostat 25 may be identical to that shown in FIGURE 1 but the thermostat 45a is modified so that the contacts 61a and 62a are normally closed and are opened on excessive temperature. The thermoelectric generator 21 supplies current to the control valve through conductor 85, contacts 56 and 57 of the thermostat 45a, a conductor 87, contacts 33 and 34 of the thermostat 25 and a conductor 88 to the control valve 19. The safety valve 17 is energized by the generator 21 through the conductor 85, contacts 61a and 62a, of the thermostat 45a and the conductor 89 to the winding of the safety valve 17. Thus, it will be seen that on excessive temperature the contacts 61a and 62a will be open and the safety valve will close. Except these connections to the safety valve this system operates in the same manner as that described in FIGURE 1.

It will be seen that the water heater system provides safe operation under all possible conditions while permitting the maximum of possible storage of hot water.

I claim as my invention:

1. A water heater system comprising, a tank having cold water inlet and hot water outlet connections, gas burner means for heating said tank including a main burner and a pilot burner, an electrical generator energized by said pilot burner, a gas supply line for said burner means, a safety valve in said line having manually operable means for moving the valve to open position and electrically operable means capable only of maintaining the valve in open position, a control valve in said line opened when electrically energized, first thermostatic switch means located to sense water temperature at a relatively low position on said tank and adjusted to actuate its contacts at a relatively low temperature, second thermostatic switch means located to sense water temperature at a relatively higher position on said tank, said second thermostatic switch means having first and second sets of contacts and being adjusted to actuate said first set of contacts at a relatively high temperature and said second set of contacts at a still higher temperature, electrical conductors connecting said generator, said first thermostatic switch means, the first set of contacts of said second thermostatic switch means, and said control valve normally to control the water temperature in said tank at the set value of said first thermostatic switch means and at the set value of the first set of contacts of said second thermostatic switch means if the contacts of said first thermostatic switch means are closed when the first set of contacts of said second thermostatic switch means are open, and electrical conductors connecting said generator, the second set of contacts of said second thermostatic switch means, and safety valve to control said safety valve on actuation of the second set of contacts of said second thermostatic switch means at the higher temperature.

2. A water heater system comprising, a tank having cold water inlet and hot water outlet connections, gas burner means for heating said tank including a main burner and a pilot burner, an electrical generator energized by said pilot burner, a gas supply line for said burner means, a safety valve in said line having manually operable means for moving the valve to open position and electrically operable means capable only of maintaining the valve in open position, a control valve in said line opened when electrically energized, first thermostatic switch means located to sense water temperature at a relatively low position on said tank and adjusted to actuate its contacts at a relatively low temperature, second thermostatic switch means located to sense water temperature at a relatively higher position on said tank, said second thermostatic switch means having first and second sets of contacts and being adjusted to actuate said first set of contacts at a relatively high temperature and said second set of contacts at a still higher temperature, electrical conductors connecting said generator, said first thermostatic switch means, the first set of contacts of said second thermostatic switch means, and said control valve normally to control the water temperature in said tank at the set value of said first thermostatic switch means and at the set value of the first set of contacts of said second thermostatic switch means if the contacts of said first thermostat switch means are actuated, and electrical conductors connecting said generator, the second set of contacts of said second thermostatic switch means, and safety valve to control said safety valve on actuation of the second set of contacts of said second thermostatic switch means at the higher temperature.

3. A water heater system comprising, a tank having cold water inlet and hot water outlet connections, gas burner means, a safety valve in said line having manually burner and a pilot burner, an electrical generator energized by said pilot burner, a gas supply line for said burner means, a safety valve in said line have manually operable means for moving the valve to open position and electrically operable means capable only of maintaining the valve in open position, a control valve in said line opened when electrically energized, first thermostatic switch means located to sense water temperature at a relatively low position on said tank and adjusted to actuate its contacts at a relatively low temperature, second thermostatic switch means located to sense water temperature at a relatively higher position on said tank, said second thermostatic switch means having first and second sets of contacts and being adjusted to actuate said first set of contacts at a relatively high temperature and said second set of contacts at a still higher temperature, electrical conductors connecting said generator, said first thermostatic switch means, the first set of contacts of said second thermostatic switch means, and said control valve normally to control the water temperature in said tank at the set values of said first thermostatic switch means and at the set value of the first set of contacts of said second thermostatic switch means and electrical conductors connecting said generator, the second set of contacts of said second thermostatic switch means, and said safety valve being electrically in parallel effectively to de-energize said safety valve and close said safety valve on closure of the second set of contacts of said second thermostat switch means upon said higher temperature being reached.

References Cited by the Examiner

UNITED STATES PATENTS

| 2,773,649 | 12/1956 | Hilgert | 236—21 |
| 2,879,358 | 3/1959 | Hilgert | 236—21 |

EDWARD J. MICHAEL, *Primary Examiner.*